(12) United States Patent
Fowler et al.

(10) Patent No.: US 6,700,583 B2
(45) Date of Patent: Mar. 2, 2004

(54) CONFIGURABLE BUFFER FOR MULTIPASS APPLICATIONS

(75) Inventors: Mark Fowler, Hopkinton, MA (US); Michael T. Wright, Marlborough, MA (US)

(73) Assignee: ATI Technologies, Inc., Thornhill (CA)

( * ) Notice: Subject to any disclaimer, the term of this patent is extended or adjusted under 35 U.S.C. 154(b) by 303 days.

(21) Appl. No.: 09/853,582

(22) Filed: May 14, 2001

(65) Prior Publication Data

US 2002/0180741 A1 Dec. 5, 2002

(51) Int. Cl.$^7$ ................................................. G09G 5/39
(52) U.S. Cl. ......................... 345/531; 345/537; 345/582
(58) Field of Search ............................... 345/531, 501, 345/506, 536, 537, 530, 552, 582, 584, 418, 419, 533, 629

(56) References Cited

U.S. PATENT DOCUMENTS

| 5,977,977 | A | | 11/1999 | Kajiya et al. |
| 6,052,126 | A | | 4/2000 | Sakuraba et al. |
| 6,236,405 | B1 | | 5/2001 | Schilling et al. |
| 6,384,824 | B1 | * | 5/2002 | Morgan et al. ............. 345/426 |
| 2002/0140703 | A1 | * | 10/2002 | Baker et al. ................. 345/582 |
| 2002/0184282 | A1 | * | 12/2002 | Yuval et al. ................. 708/495 |

* cited by examiner

*Primary Examiner*—Kee M. Tung
(74) *Attorney, Agent, or Firm*—Pillsbury Winthrop LLP (57) ABSTRACT

A configurable buffer has two storage areas. Depending upon a state of a buffer control signal, the two storage areas are configured to buffer a single stream of data together or to buffer two streams of data separately. In an exemplary video graphics processing application, one stream of data includes pass-through values of fragments being rendered (e.g. color, location, and/or depth values) and the other stream of data includes corresponding displaced (or otherwise perturbed) texture coordinate pairs. Such a buffer may be used to reduce the amount of buffer storage needed to support both single-pass and multipass operations in a pixel pipeline.

28 Claims, 13 Drawing Sheets

CONFIGURABLE BUFFER FOR MULTIPASS APPLICATIONS

BACKGROUND OF THE INVENTION

1. Reservation of Copyright

The disclosure of this patent document contains material that is subject to copyright protection. The copyright owner has no objection to the facsimile reproduction by anyone of the patent document, or the patent disclosure as it appears in the U.S. Patent and Trademark Office patent files or records, but otherwise reserves all copyright rights whatsoever.

2. Field of the Invention

This invention relates to video graphics processing.

3. Background of the Invention

Figure 1:
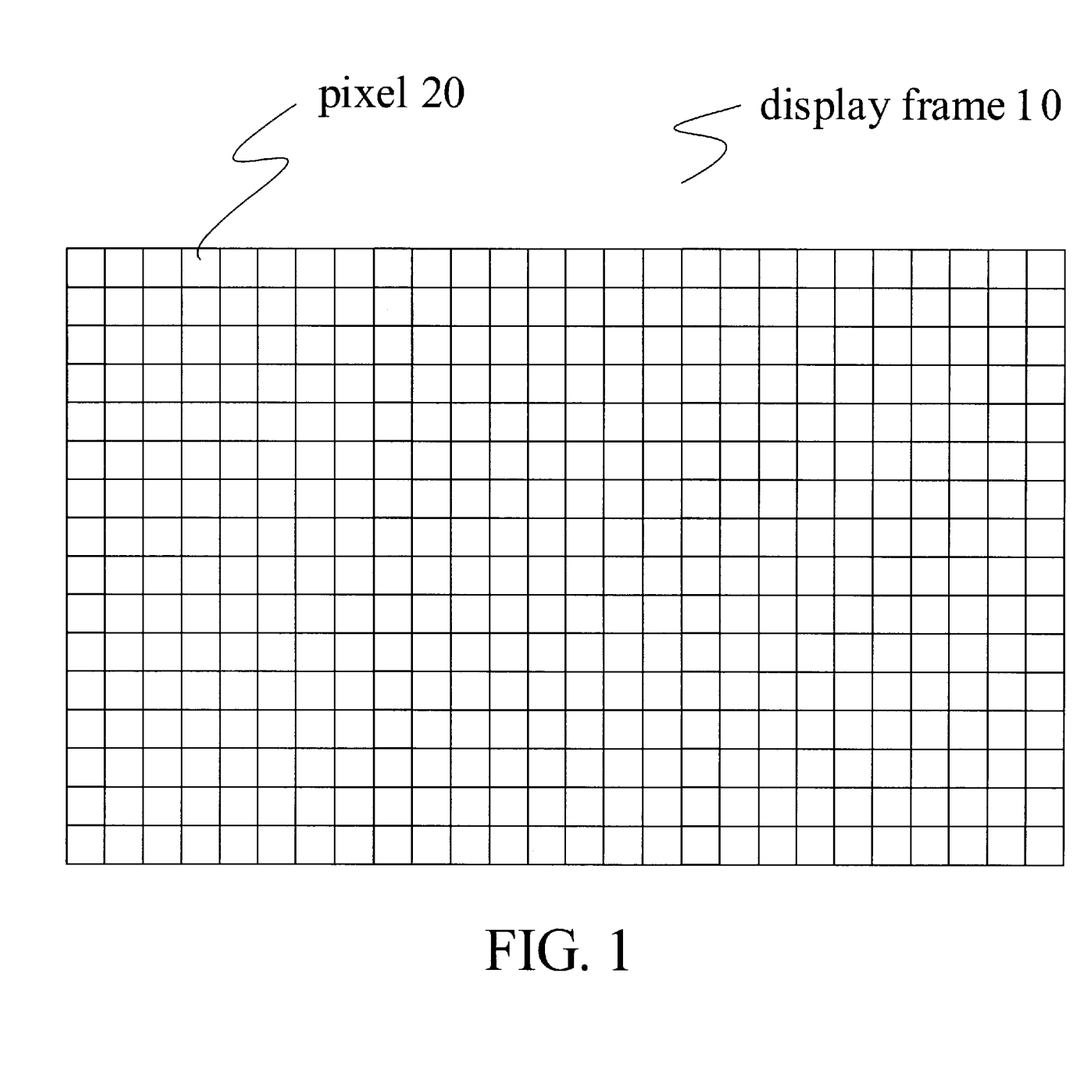
FIG. 1 shows a diagram of a display frame 10.

Graphics rendering is an important part of many representational and interactive applications for computers. In three-dimensional (or '3D') graphics rendering, an image of a 3D rendering space is presented on a display frame as if the space is being viewed through a two-dimensional display plane. As shown in FIG. 1, the display frame 10 is an array of individual picture elements (or 'pixels') 20. Each pixel represents a sample of the display plane at a specified location and has a color value that corresponds to the color of the rendering space as viewed through the display plane at that location. The pixels are closely spaced, and the viewer's visual system performs a filtering of the individual pixels to form a composite image. If an image is properly partitioned into pixels that are sufficiently close together, the viewer perceives the displayed array as a virtually continuous image.

Three-dimensional 'wire frame' models of objects in the rendering space are constructed using graphics primitives (e.g. triangles or other polygons). Each primitive is defined by a set of vertices that have values indicating location (e.g. in an XYZ coordinate space) and quality (e.g. color). Each of these vertex values may also have subvalues; for example, a vertex color value may include a subvalue for each of the components in the colorspace (e.g. RGB, HSV, YCbCr), a subvalue for luminance, and/or an opacity or 'alpha' subvalue.

Some or all of the rendering of the object models into pixels may be performed in software. Alternatively, the sets of vertices may be presented to rendering hardware, either directly by the software application or via an application programming interface (API) such as the Direct3D component of the DirectX API suite (Microsoft Corp, Redmond, Wash.) or the OpenGL API (Silicon Graphics, Inc., Mountain View, Calif.).

Figure 2:
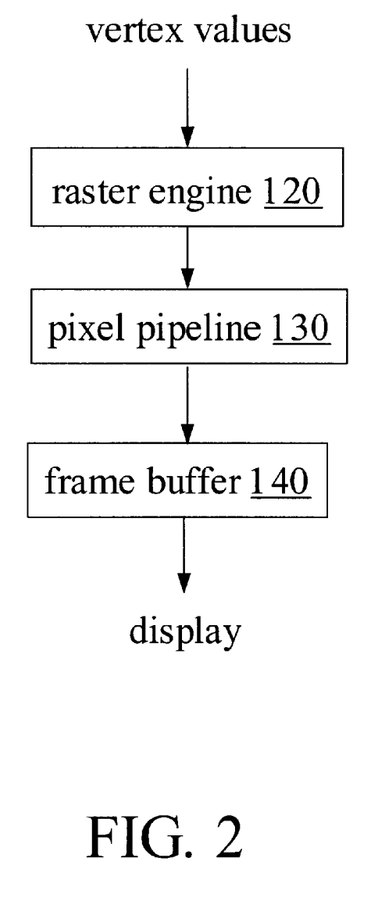
FIG. 2 shows a block diagram of a 3D graphics architecture.
Figure 3:
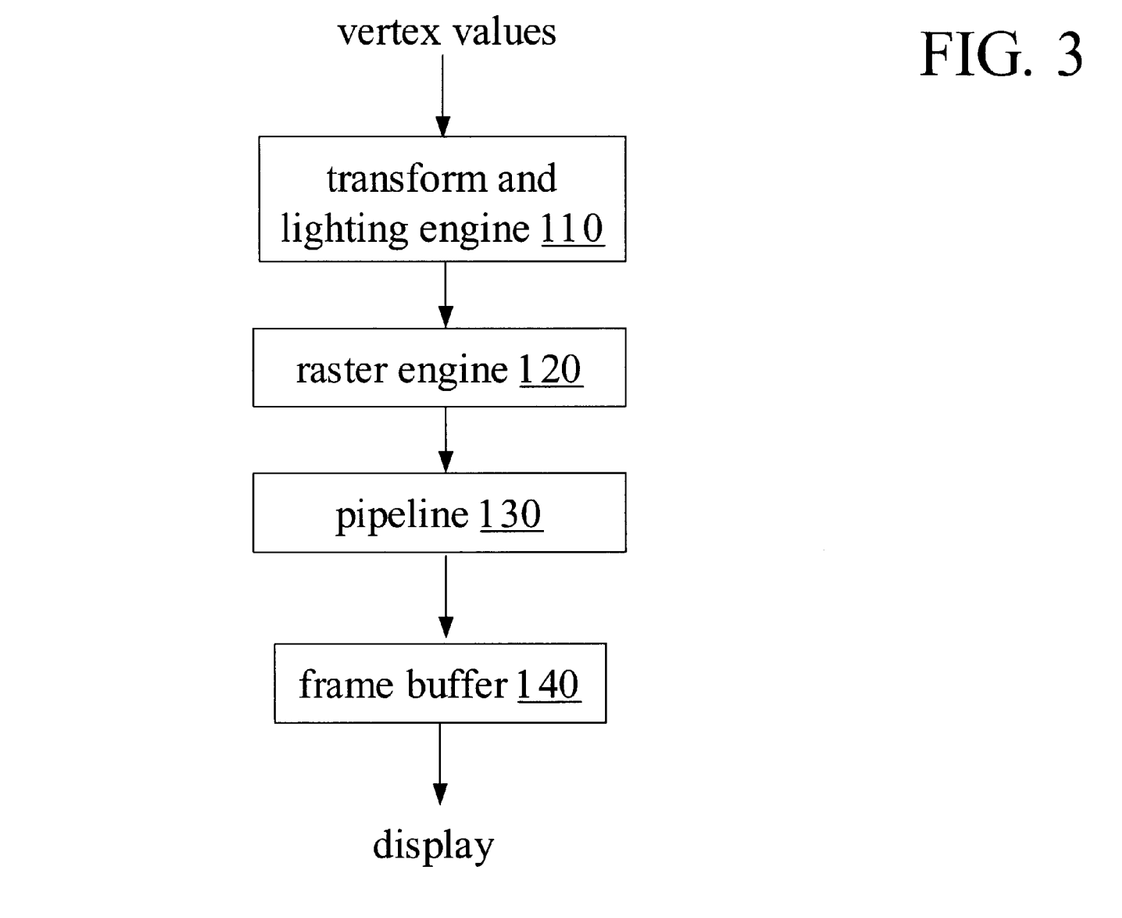
FIG. 3 shows a block diagram of a 3D graphics architecture that includes a transform and lighting engine.

One example of rendering hardware suitable for receiving sets of vertices is a 3D graphics architecture as shown in FIG. 2. Raster engine 120 scan-converts (or 'rasterizes') polygons into data sets called 'fragments' that correspond to pixels in the display frame and have values relating to such qualities as color (e.g. R, G, B, and alpha), depth (i.e. Z location) and texture. Fragments may be processed in a pipeline 130 (also called a 'pixel pipeline') before their color values are incorporated into corresponding pixels of a frame buffer 140 that represents the display frame. As shown in FIG. 3, a graphics architecture may also include a transform and lighting engine 110 that performs coordinate transform operations (e.g. translation, rotation, scaling), lighting operations, and/or clipping operations on vertices before rasterization.

An object rendered using only a few polygons may have large flat surfaces and appear simplistic and artificial. While detail features may be added to a surface by tessellation (i.e. increasing the number of primitives used to model the surface), adding features in this manner may substantially increase the number of polygons in the image and reduce the fill rate to an unacceptable level.

A technique called 'texture mapping' is used to add realistic detail to the surface of a rendered object without modeling the features explicitly. This technique applies a texture map (i.e. an array of texture elements or 'texels' defined in an ST texture coordinate space) to the surface of a polygon to create the illusion of surface detail. Texture mapping may be performed in a 3D graphics architecture by assigning to each fragment (for example, in the raster engine or the transform and lighting engine) an ST coordinate pair (s, t) that indicates a particular texel in the texture map.

Figure 4:
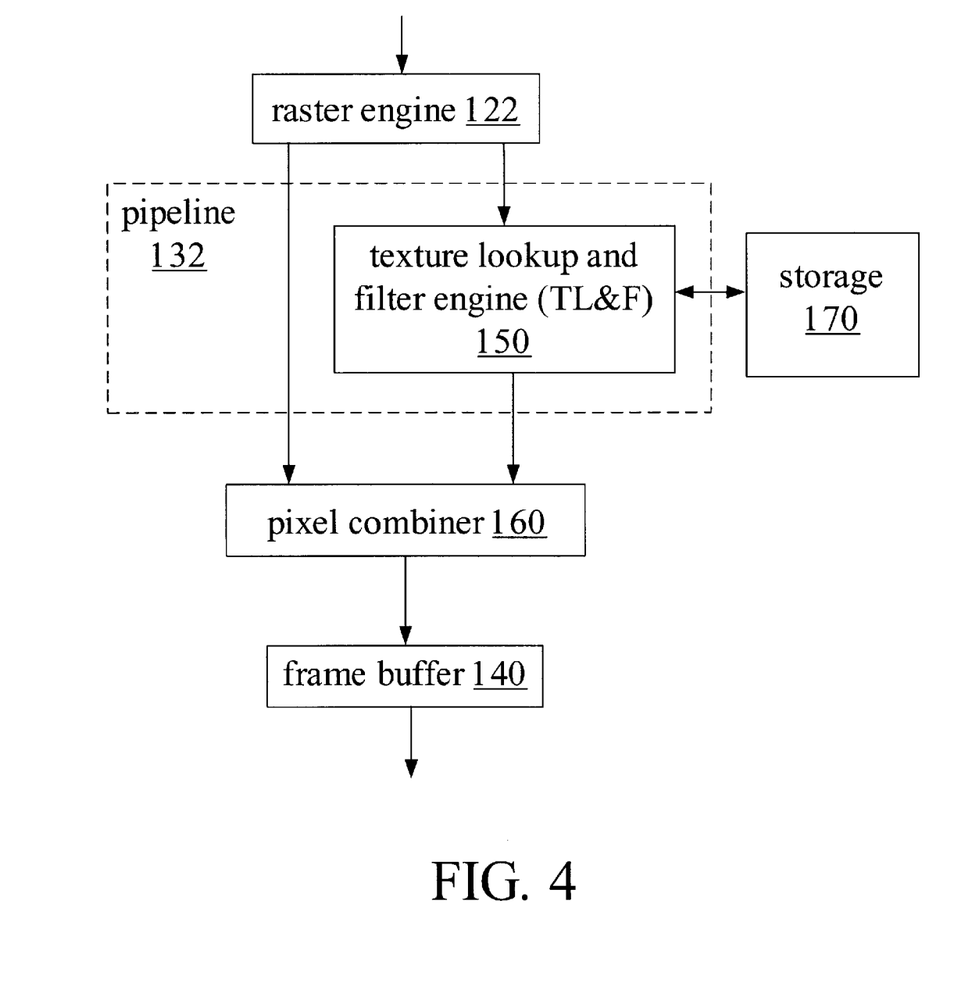
FIG. 4 shows a block diagram of a 3D graphics architecture that includes a pipeline having a texture datapath.
Figure 5:
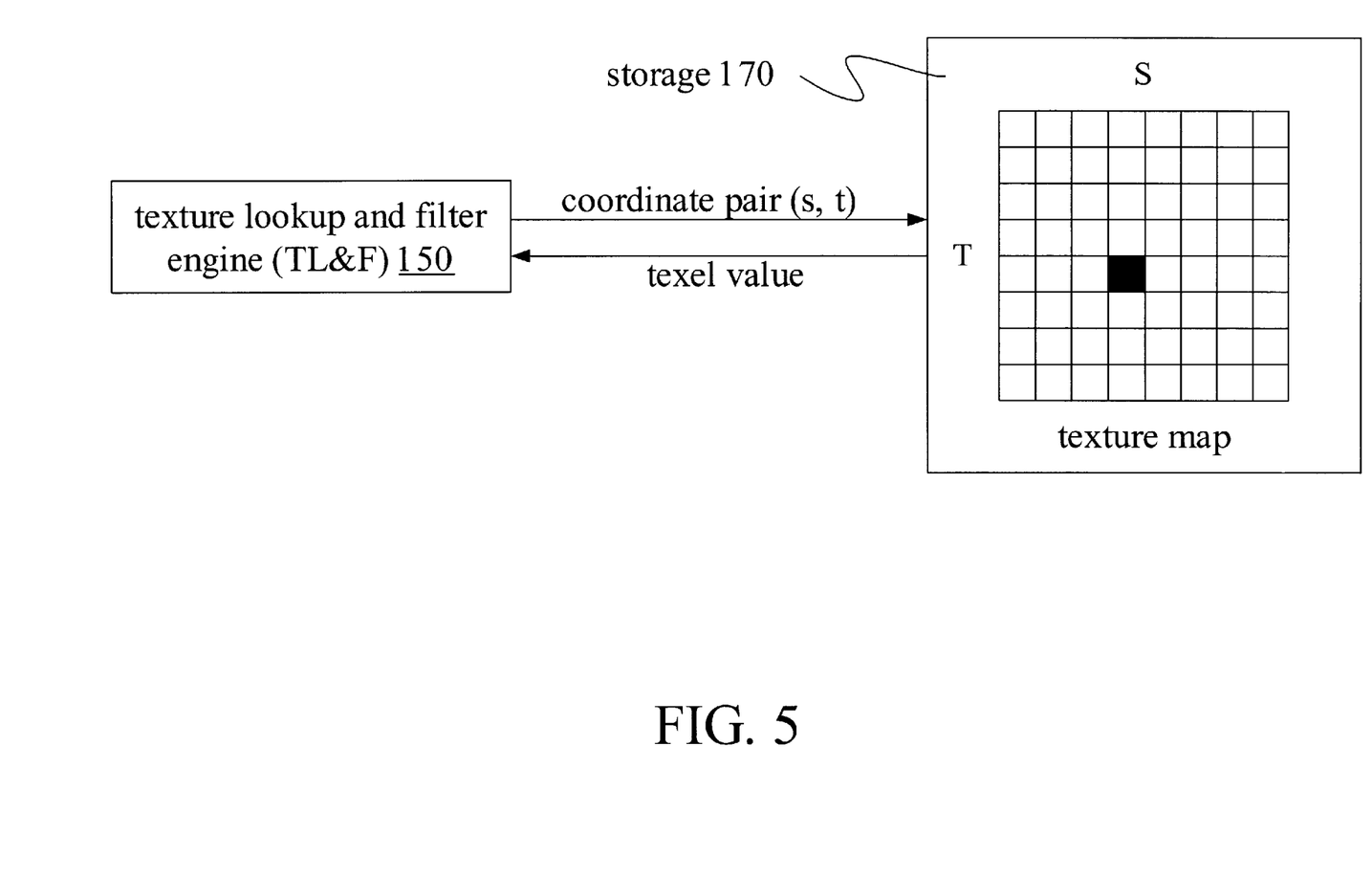
FIG. 5 is an illustration of a texture mapping operation.

FIG. 4 shows a block diagram of a 3D graphics architecture capable of supporting texture mapping that includes a pipeline 132 having a texture lookup and filter engine (TL&F) 150. As shown in FIG. 5, TL&F 150 references a texture map stored in storage 170 according to a coordinate pair received from raster engine 122. TL&F 150 receives a texel value as indicated by the coordinate pair and forwards the texel value to a pixel combiner 160. Raster engine 122 may output other quality values or subvalues for a fragment (e.g. a base color value) that are combined with the texel value in pixel combiner 160 to produce the color value of the pixel to be stored in frame buffer 140. A pixel pipeline 132 may support multiple texture datapaths (e.g. multiple instances of TL&F 150 and/or multiple passes through one such unit), and pixel combiner 160 may receive values from more than one texture map (e.g. one or more lighting maps) for a single fragment.

SUMMARY

A configurable buffer according to one embodiment of the invention has first and second buffer storage areas, first and second input ports, and first and second output ports. The buffer is configured and arranged to receive first portions of a plurality of data sets through the first input port. The buffer is also configured and arranged to receive a buffer control signal. When the buffer control signal has one state, the buffer is configured and arranged to store some of the first portions in each of the two buffer storage areas. When the buffer control signal has a different state, the buffer is configured and arranged to store the first portions in the first buffer storage area, to receive second data values through the second input port, and to store the second data values in the second buffer storage area.

DETAILED DESCRIPTION

Within a pixel pipeline, operations performed on the various values of a fragment may proceed along different datapaths and/or at different rates. In order to provide a larger and more detailed texture image, for example, texture maps are generally stored off-chip (e.g. in system memory), and as a consequence the storage access operation required to retrieve a texel value may have a latency of many processing cycles. In some implementations, a texture map may also be compressed for efficient storage and/or transfer, requiring a decompression operation (and resulting in an additional delay) upon retrieval. Such latencies may slow the rate of the texture datapath in relation to the datapaths of other fragment value operations.

Figure 6:
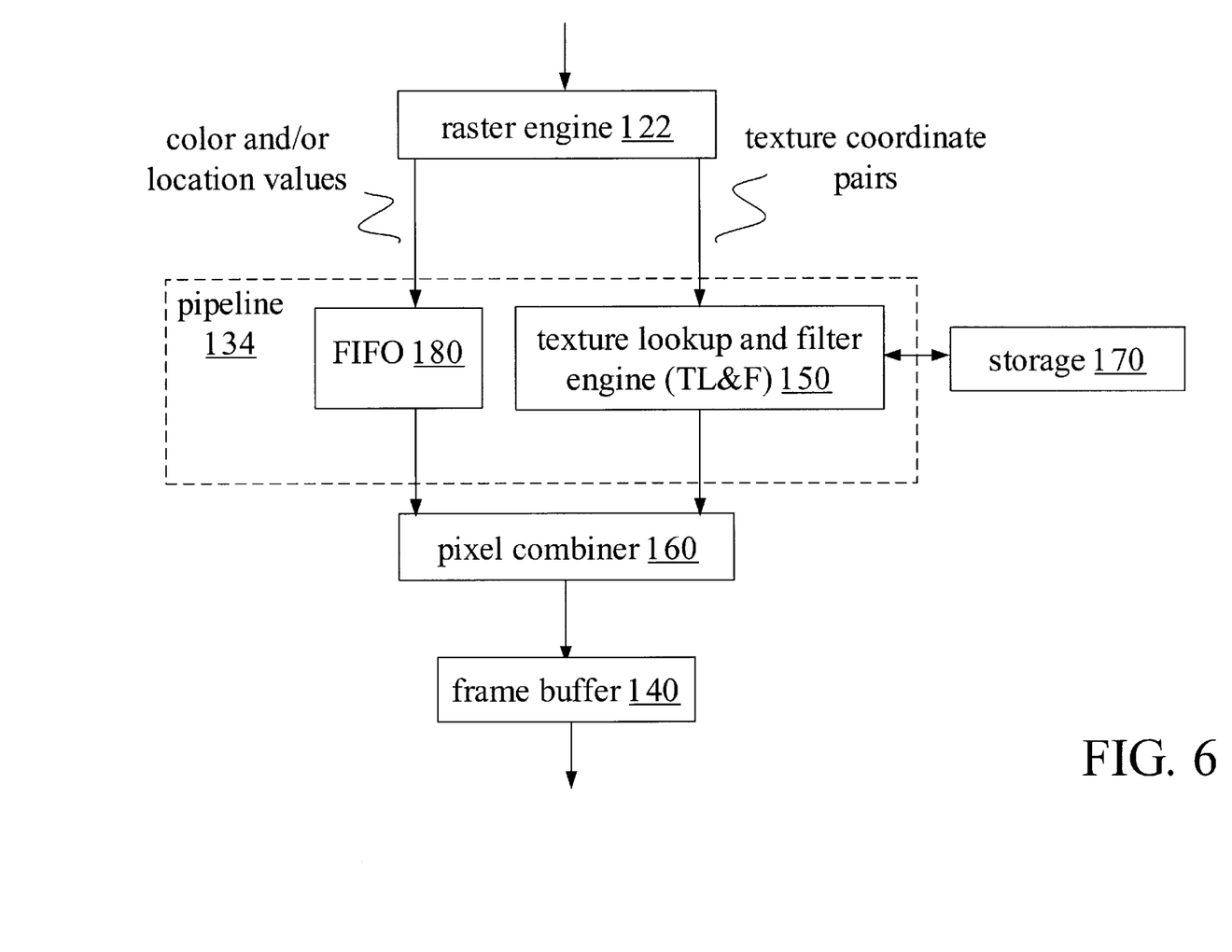
FIG. 6 shows a block diagram of a 3D graphics architecture that includes a FIFO buffer in a pass-through datapath.

In order to synchronize the presentation of the various fragment values to the pixel combiner, it may be desirable to buffer one datapath to account for a delay in another datapath. FIG. 6 shows a block diagram of a 3D architecture having a pipeline 134 that includes a FIFO buffer 180 in a pass-through datapath. In an exemplary application, color and/or location values are carried on the pass-through datapath, and FIFO 180 compensates for latencies encountered in a texture datapath.

In one implementation, pixel combiner 160 is a unit (e.g. a processing unit, or a sequence of instructions executing on a processing unit) that receives two or more source values (e.g. fragment values from texture maps or iterated variables) and combines them into a single fragment value. For example, pixel combiner 160 may be implemented as a programmable multiplier/adder combination.

A pixel combiner (e.g. pixel combiner 160) may perform a fixed operation such as addition or subtraction of values received at its inputs. Alternatively, a pixel combiner may be programmable (e.g. on a per-pixel or per-block basis) to perform operations such as addition (color value 1+color value 2), subtraction (color value 1×color value 2), and/or blending ([color value 1×blending factor] +[color value 2×(1-blending factor)]), wherein the blending factor may be an opacity value.

Figure 7:
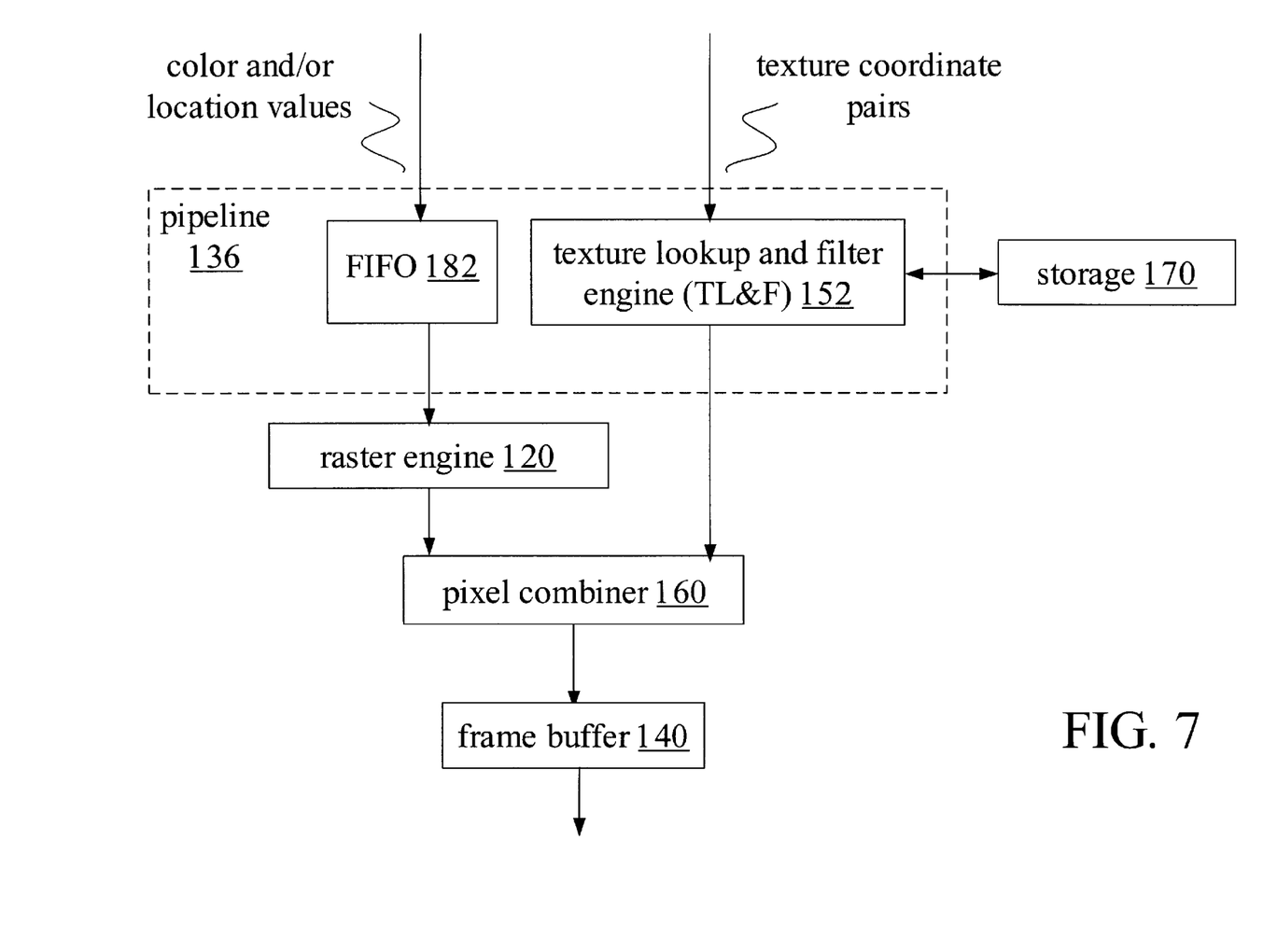
FIG. 7 shows a block diagram of a 3D graphics architecture that includes a pipeline upstream of a raster engine.

In order to minimize access time between stages of the architecture, it may be desirable to design the FIFO buffer and the TL&F into the same chip as the pixel combiner. The TL&F and the pixel combiner may also be implemented as processes executing on one or more microprocessors, embedded processors, or other arrays of logic elements (and possibly on the same array). FIG. 7 shows a block diagram of an alternate architecture in which pipeline 136 (including TL&F 152 and FIFO buffer 182) receives vertex values rather than rasterized fragments.

At any moment, one or more other devices and/or program modules may compete with the TL&F for storage or bus access. Additionally, the compression status of blocks of texels retrieved from storage may vary from one block to the next. As a result, latencies encountered in the texture datapath may be variable and/or unpredictable. While it is desirable for the FIFO buffer to store a sufficient number of fragment values to buffer a maximum expected latency, the capacity of the FIFO buffer is limited by the amount of chip area available.

While texture mapping may significantly enhance the appearance of a rendered image, details added in this manner are two-dimensional. As lighting conditions change, the appearance of a texture-mapped surface may not change as the mapped details would suggest. In order to achieve a rendered surface whose appearance changes more realistically with lighting conditions, per-pixel perturbations may be applied to the surface being rendered using a multipass approach such as bump mapping.

Figure 8A:
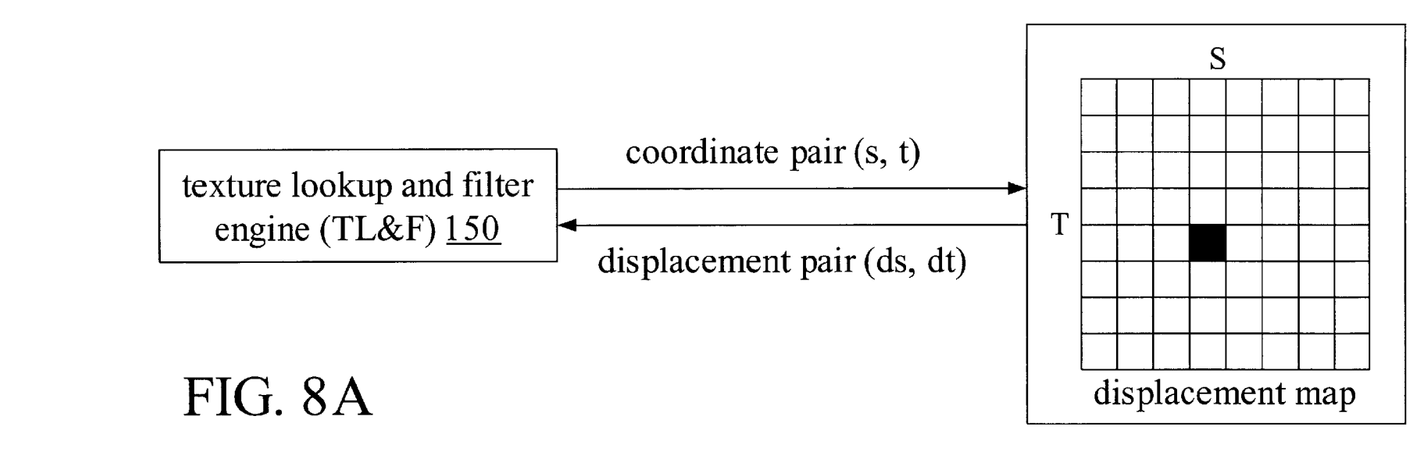
FIG. 8A is an illustration of a first pass of an environment-mapped bump-mapping (EMBM) operation.
Figure 8B:
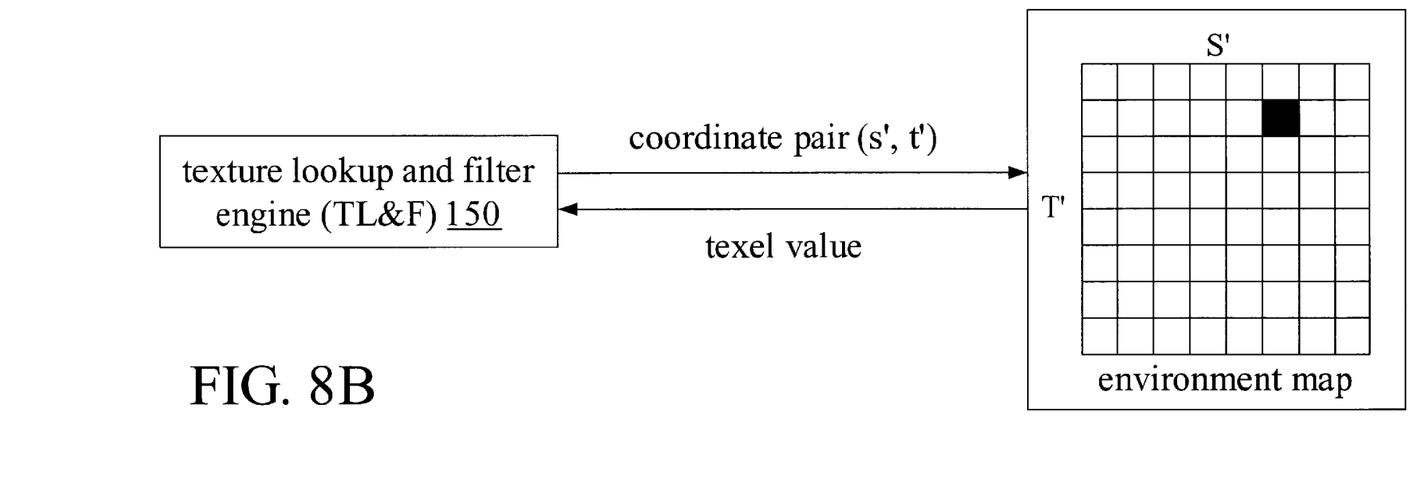
FIG. 8B is an illustration of a second pass of an environment-mapped bump-mapping (EMBM) operation.

One bump-mapping technique that is supported by the Direct3D and OpenGL APIs is environment-mapped bump mapping (EMBM). FIGS. 8A and 8B show how EMBM may be implemented in a serial fashion. In FIG. 8A, TL&F 150 uses a coordinate pair (e.g. in the ST texture coordinate space) to reference a specialized texture map called a 'bump map' (also called a 'perturbation map,' 'texture coordinate displacement map,' or simply 'displacement map'). Instead of a texel value, the referenced map location contains a displacement vector (ds, dt) that TL&F 150 applies to perturb the coordinate pair (or, alternatively, another set of coordinate values) to obtain a new coordinate pair in another coordinate space (e.g. an S'T' environment coordinate space). For example, a TL&F operating in response to commands from a Direct3D API may apply a coordinate perturbation according to the following matrix equation:

$$[s'\ t'] = [s\ t] + \left([ds\ dt] \times \begin{bmatrix} M_{00} & M_{01} \\ M_{10} & M_{11} \end{bmatrix}\right)$$

where $$\begin{bmatrix} M_{00} & M_{01} \\ M_{10} & M_{11} \end{bmatrix}$$

is a predefined (and possibly variable) rotation/scaling matrix and (s', t') is the resulting coordinate pair in the S'T' environment coordinate space. (In another application, TL&F may use the displacement vector to perturb a different set of coordinate values as received from a raster engine or other processing stage or storage element.) As shown in FIG. 8B, TL&F 150 references an environment map according to the new coordinate pair to obtain a texel value.

In a graphics application where multiple texture mappings are performed on a single fragment, system throughput may be increased by including multiple TL&Fs in the pipeline for parallel operation. In an EMBM operation, however, the reference into the environment map depends on the result of the reference into the displacement map. Because this technique includes sequential map accesses, the use of EMBM may result in increased latency as compared to single-access texture mapping techniques, even in a pipeline that includes multiple TL&Fs.

Figure 9:
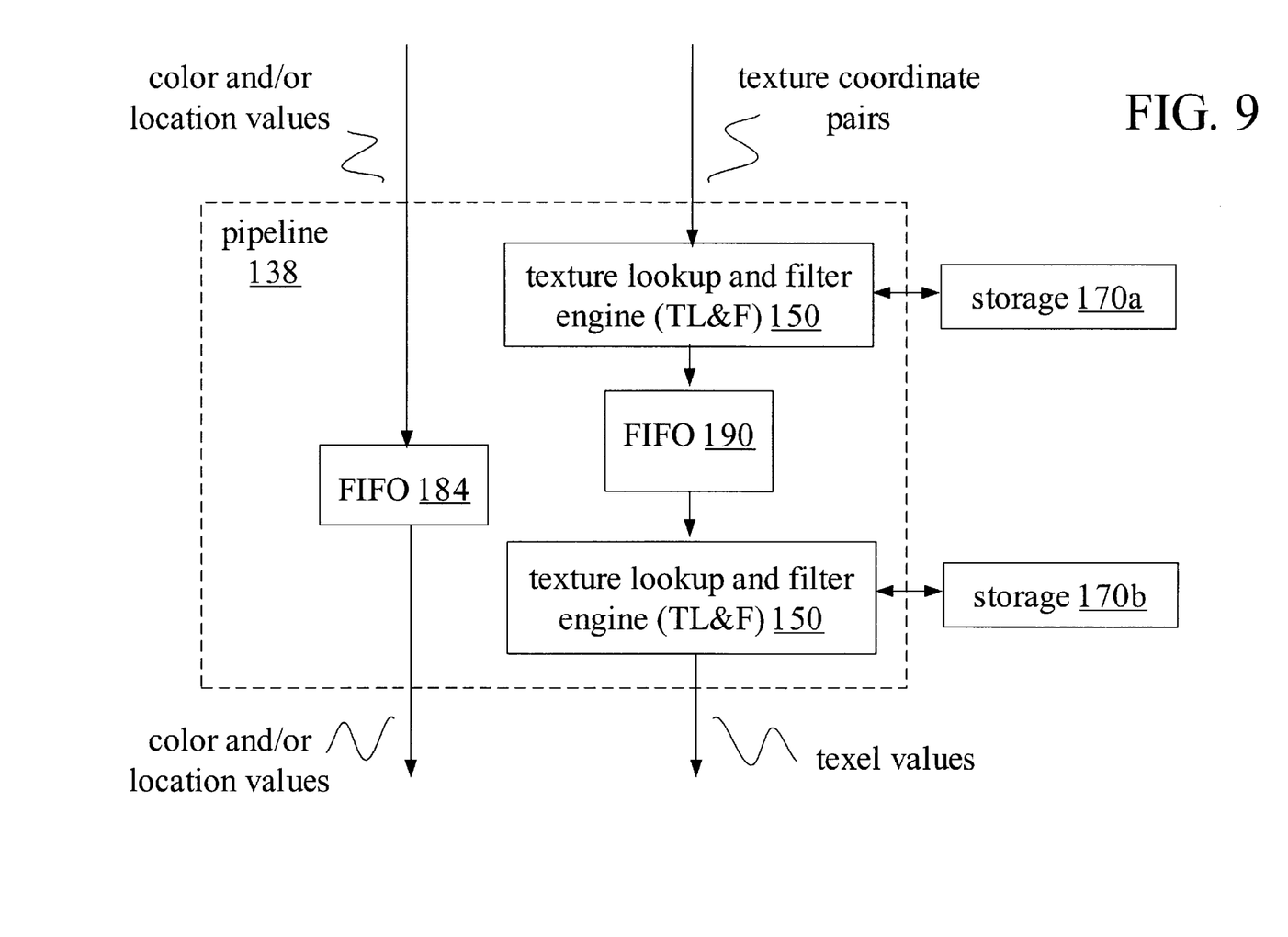
FIG. 9 shows a procedural diagram of a multipass operation performed in a datapath parallel to a pass-through datapath.

FIG. 9 shows an operational diagram of a pipeline 138 performing a multipass map access operation such as EMBM. In a first map access pass, TL&F 150 accesses a bump map in storage 170*a* according to a pair of coordinates in the texture space and obtains the referenced displacement vector. Using the displacement vector to perturb the coordinate pair as described above, TL&F 150 produces a displaced coordinate pair. In a second map access pass, TL&F 150 uses the displaced coordinate pair to access an environment map in storage 170*b* (which may be a part of the same storage element as storage 170*a* or may be in a different element) and obtains a texel value.

It may be desirable for pipeline 138 to include a FIFO buffer 190 in the texture datapath (e.g. as shown in FIG. 9). Depending on the particular system implementation, it may be more efficient to receive and process a block of fragments in each pass, rather than to process fragments individually from one pass to the next. For example, all of the coordinate pairs of a block of fragments may be processed in a first pass, with the corresponding displaced pairs being stored in buffer 190. When all of the storage accesses in the first pass have completed, the displaced pairs are processed in a second pass. In such a case, the two passes may include accesses to the same storage element and/or over the same busses without conflicting with each other. Buffer 190 may also protect the second pass from data starvation or overload caused by variable storage access latencies. Because the additional access to storage 170*b* will generally increase the total latency in the texture datapath relative to the pass-through datapath (as compared to a single-pass operation), it may be desirable to use a larger FIFO buffer 184 in the pass-through datapath.

Figure 10:
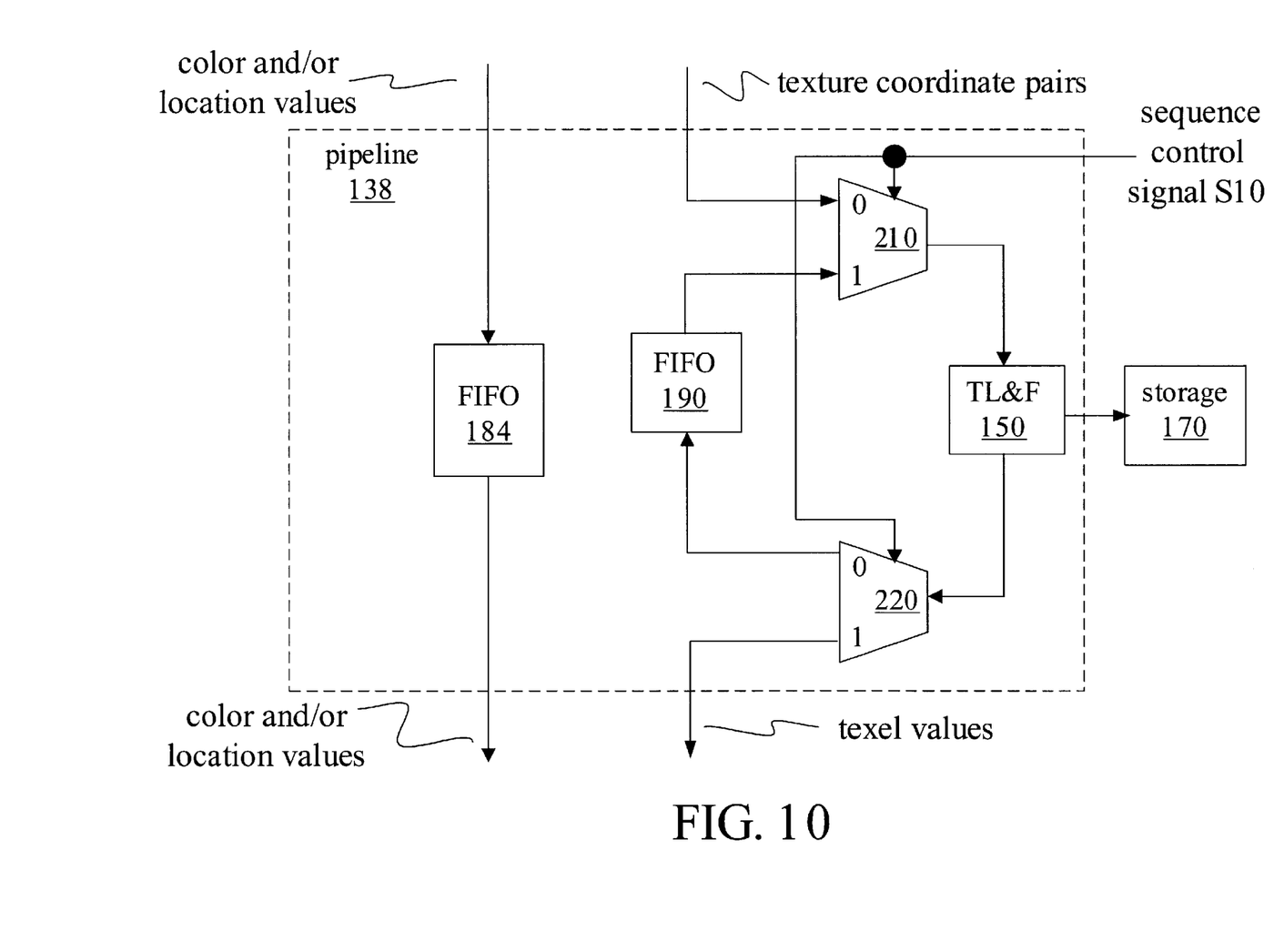
FIG. 10 shows a block diagram of a circuit to support a multipass operation.

FIG. 10 shows a circuit diagram of a pipeline 138 to support a multipass operation as shown in FIG. 9. During a first pass, sequence control signal S10 has a low or '0' value, permitting TL&F 150 to receive texture coordinate pairs via multiplexer 210 and to store the corresponding displaced coordinate pairs to FIFO buffer 190 via demultiplexer 220. During a second pass, sequence control signal S10 has a high or '1' value, permitting TL&F 150 to receive the displaced coordinate pairs from FIFO buffer 190 via multiplexer 210 and permitting pipeline 138 to output the corresponding texel values to a subsequent stage (e.g. a pixel combiner) via demultiplexer 220.

It is possible that a multipass operation such as EMBM may be used to render only a portion of the pixels of a frame (i.e. fewer than all of the objects in the rendering space). Therefore, it may be desirable for a pipeline 138 as shown in FIG. 10 to support both single-pass and multipass operations. For example, the pipeline may include one or more multiplexers (or a similar mechanism) that may be controlled to configure the texture datapath as appropriate.

Although it may be desirable to support multipass operations, the increased buffer capacity required to implement FIFO buffer 190 may cause problems relating to availability of surface area during chip design. Moreover, the chip area devoted to buffer 190 may be idle and wasted during single-pass operations. It is desirable to configure a multipass pipeline to use the FIFO buffers efficiently during both single-pass and multipass operations.

A configurable pipeline according to an embodiment of the invention is constructed to receive a buffer control signal and a plurality of data sets, where each data set has a first portion and a second portion. For example, each data set may represent a fragment, where the first portion may include a color, location, or depth value and the second portion may include a texture coordinate pair. The pipeline includes a first buffer storage area constructed to receive, store, and output at least some of the first portions of the data sets. The pipeline also includes a logical unit (e.g. a TL&F) that is coupled to first and second data storage areas. For example, the second data storage area may hold an environment map, while the first data storage area may hold a bump map or other texture map. The logical unit is constructed to receive the second portions and to obtain first accessed data sets (e.g. displacement vectors or texel values) from the first storage area according to the second portions.

When the buffer control signal has one state (e.g. a low value), a second buffer storage area of the pipeline is configured to receive, store, and output at least some of the first portions. When the buffer control signal has another state (e.g. a high value), the second buffer storage area is configured to receive, store, and output intermediate data sets from the logical unit that are based on the first accessed data sets. In certain applications, the first accessed data sets may be the same as the intermediate data sets. In an exemplary application, the intermediate data sets are displaced coordinate pairs obtained by perturbing the second portions (or other data values or sets) according to the first accessed data sets. The logical unit may be further configured to receive the intermediate data sets from the second buffer storage area and to obtain second accessed data sets (e.g. texel values) from the second data storage area according to the intermediate data sets.

Figure 11:
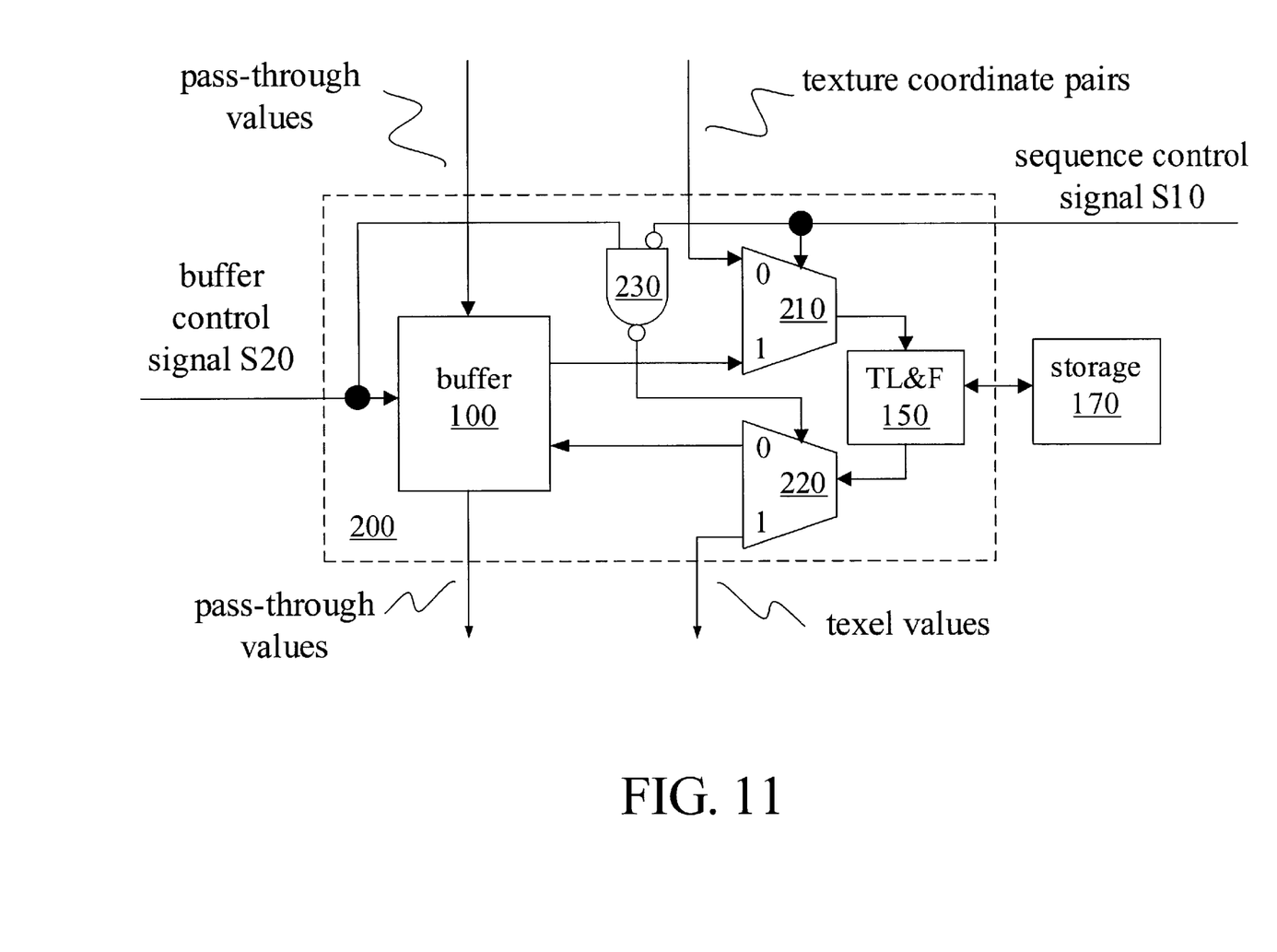
FIG. 11 shows a block diagram of a pipeline according to an embodiment of the invention.

FIG. 11 shows a block diagram of a pipeline according to an embodiment of the invention that is configured to receive pass-through values (e.g. color, location, and/or depth values of fragments) and corresponding texture coordinate pairs. In both single-pass and multipass operations, buffer 100 receives, stores, and outputs the pass-through values. For a single-pass operation, sequence control signal S10 and buffer control signal S20 are both held low, and TL&F 150 receives the texture coordinate pairs via multiplexer 210. From a first area of storage 170, TL&F 150 obtains texel values corresponding to the coordinate pairs and outputs the texel values to demultiplexer 220. Because gate 230 outputs a high value in response to the low values at its inputs, demultiplexer 220 is configured to output the texel values from the pipeline (e.g. to a subsequent stage).

For a multipass operation, buffer control signal S20 is held high. During a first pass, sequence control signal S10 is held low, and TL&F 150 receives the texture coordinate pairs via multiplexer 210 and obtains displacement vectors corresponding to the coordinate pairs from the first area of storage 170. In this case, TL&F 150 is also configured to perturb the coordinate pairs by applying the displacement vectors and to output the displaced coordinate pairs to demultiplexer 220. In response to the high value on buffer control signal S20 and the low value on sequence control signal S10, gate 230 outputs a low value, and buffer 100 receives and stores the displaced coordinate values from demultiplexer 220.

During a second pass, sequence control signal S10 is held high, and TL&F 150 receives the displaced coordinate pairs via multiplexer 210. In this case, TL&F 150 is configured to obtain texel values corresponding to the displaced coordinate pairs from a second area of storage 170. Because gate 230 outputs a high value in response to the high values at its inputs, demultiplexer 220 is configured to output the texel values from the pipeline (e.g. to a subsequent stage).

A configurable buffer according to an embodiment of the invention has two buffer storage areas, two input ports, and two output ports. At least one of the buffer storage areas may be implemented as a ring buffer (also called a circular queue). The buffer is constructed to receive data values at the first input port, to store at least some of the data values in the first buffer storage area, and to output the data values through the first output port. The buffer is also constructed to receive a control signal. If the control signal has a first state (e.g. a low value), the buffer is configured to store at least some of the data values in the second buffer storage area. For example, the first and second buffer storage areas may be configured in this case to form a queue having a capacity equal to the sum of the individual capacities of the buffer storage areas. If the buffer control signal has a second state (e.g. a high value), the buffer is configured to receive other data values at the second input port, to store the other data values in the second buffer storage area, and to output the other data values through the second output port.

Figure 12:
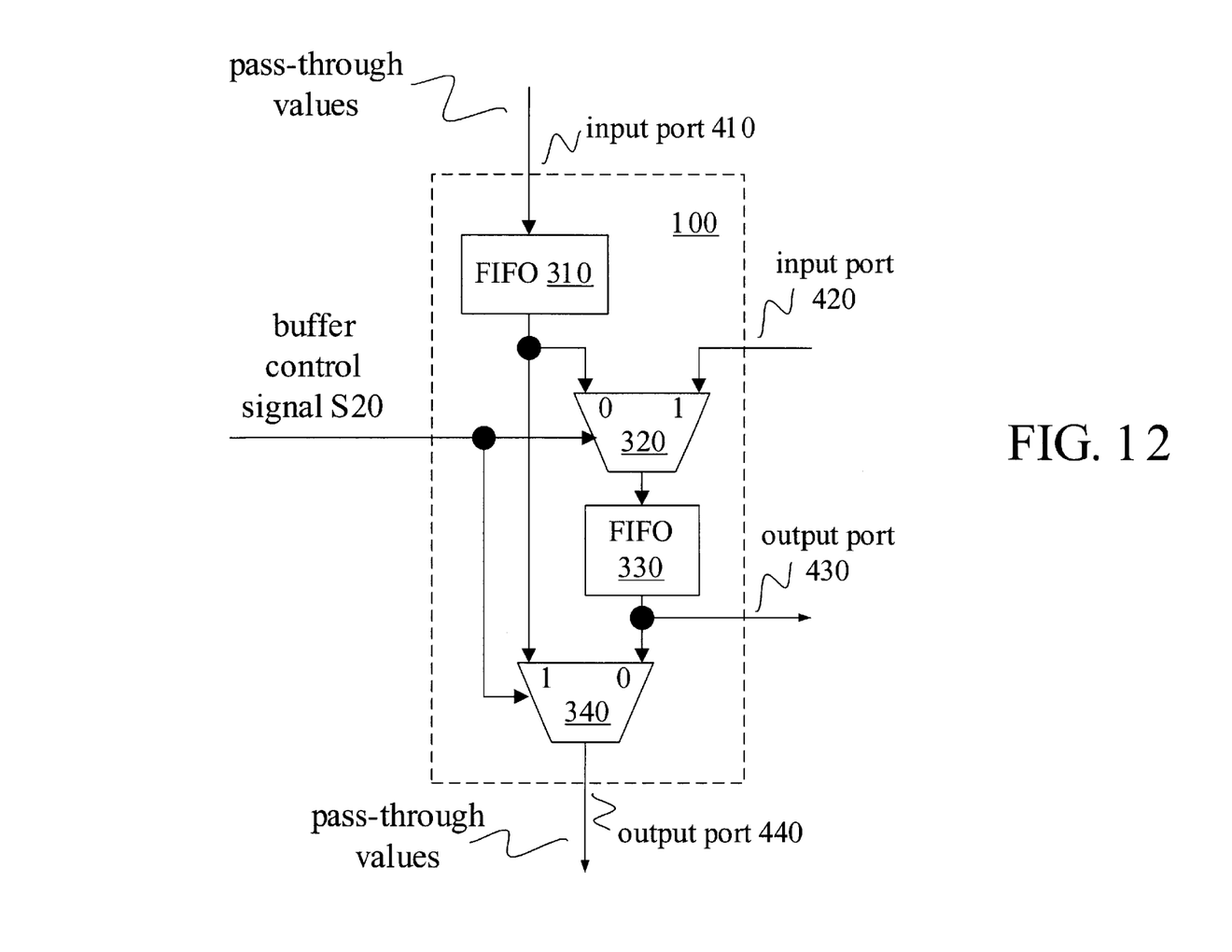
FIG. 12 shows a block diagram of a buffer according to an embodiment of the invention.

FIG. 12 shows a block diagram of a buffer 100 according to an embodiment of the invention. Buffer 100 receives pass-through values at input port 410. If buffer control signal S20 has a low value, demultiplexer 320 joins buffer storage areas (here, FIFO units) 310 and 330 into a single queue for pass-through value storage, and the buffer outputs the pass-through values through output port 440 via demultiplexer 340. If buffer control value S20 has a high value, demultiplexer 340 is configured to output pass-through values directly from FIFO unit 310, while FIFO unit 330 receives displaced coordinate pairs (e.g. from TL&F 150) through input port 420 via demultiplexer 320 and stores and outputs the displaced pairs (e.g. to TL&F 150) through output port 430. In the latter case, it may be also possible (e.g. by manipulating the control input to multiplexer 340) to retrieve values from both FIFO units in a single clock cycle.

Figure 13A:
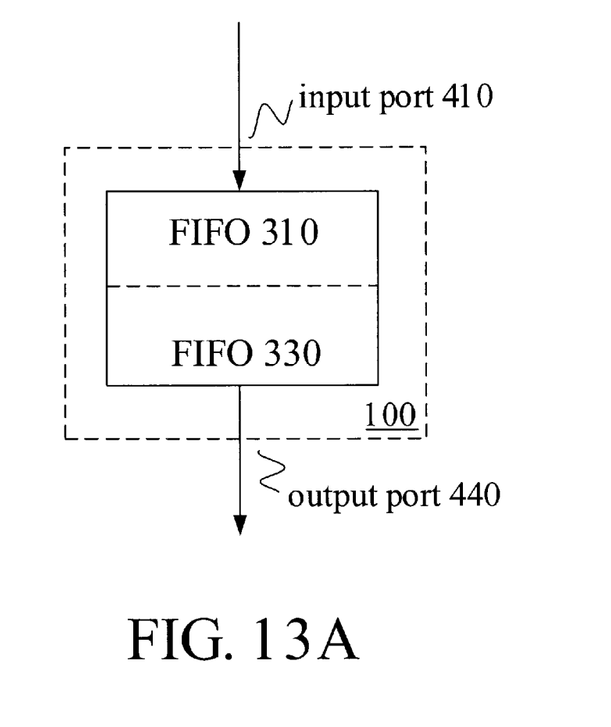
FIG. 13A depicts the operating relation of FIFO units of a buffer according to an embodiment of the invention when the buffer control signal has a first state.
Figure 13B:
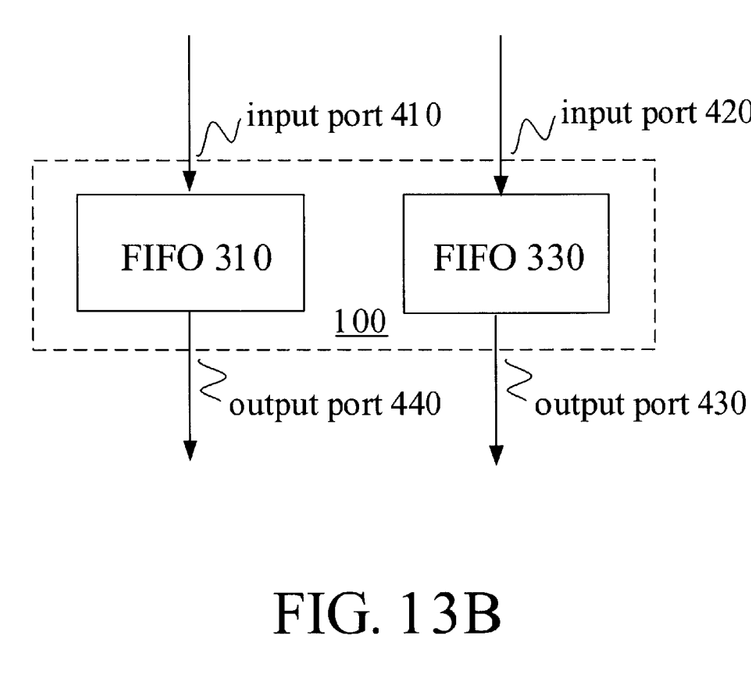
FIG. 13B depicts the operating relation of FIFO units of a buffer according to an embodiment of the invention when the buffer control signal has a second state different than the first state.

FIG. 13A shows how the FIFO units 310 and 330 perform as a single queue when buffer control signal S20 has a low value, and FIG. 13B shows how the two FIFO units buffer separate data streams when buffer control signal S20 has a high value. Arrangements of FIFO units 310 and 330 other than that illustrated in FIG. 12 are also possible. For example, FIFO units 310 and 330 may be implemented as adjacent storage areas in the same address space that are joined or separated by manipulating one or more end-of-buffer values. A single memory unit that includes FIFO units 310 and 330 may have two or more read ports (possibly supporting retrieval of values from both FIFO units in a single clock cycle) or only a single read port (which may require two clock cycles to retrieve values from each of the FIFO units).

The foregoing presentation of the described embodiments is provided to enable any person skilled in the art to make or use the present invention. Various modifications to these embodiments are possible, and the generic principles presented herein may be applied to other embodiments as well. For example, although a use of a configurable buffer according to an embodiment of the invention to support EMBM is described, such a buffer may be used to support multipass techniques in other graphics applications, such as multipass alpha-blending, as well as in other data processing applications.

For example, a configurable buffer according to an embodiment of the invention may be applied generally to the use of a dependent texture in a rendering operation. In this sense, a dependent texture is one whose data values are addressed by or are otherwise defined as a function of data values of another texture map. Applications of such a buffer may also be extended to other multipass contexts in which data values may be addressed by (or be otherwise dependent upon) the results of an initial data retrieval or processing operation.

Additionally, an embodiment of the invention may be implemented in part or in whole as a hard-wired circuit or as a circuit configuration fabricated into a video graphics integrated circuit or field-programmable gate array. Such an embodiment may be implemented in (or the operations of such an embodiment may be performed by) one chip or divided among more than one chip. Likewise, an embodiment of the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit. Further, an embodiment of the invention may be expressed in part or in whole in a hardware description language such as VHDL or Verilog.

Further, an embodiment of the invention may be implemented in part or in whole as a software program loaded as machine-readable code from or into a data storage medium such as a magnetic, optical, magnetooptical, or phase-change disk or disk drive; a semiconductor memory; or a printed bar code. Thus, the present invention is not intended to be limited to the embodiments shown above but rather is to be accorded the widest scope consistent with the principles and novel features disclosed in any fashion herein.

What is claimed is:

1. A method of data buffering, said method comprising:
receiving a buffer control signal;
receiving a plurality of data sets, each data set including a first portion and a second portion;
storing at least some of the plurality of first portions to a first buffer storage area and then outputting the stored first portions from the first buffer storage area;
obtaining first accessed data sets from a data storage area according to the plurality of second portions;
when the buffer control signal has a first state, storing at least some of the plurality of first portions to a second buffer storage area and then outputting the stored first portions from the second buffer storage area; and
when the buffer control signal has a second state different than the first state, storing to the second buffer storage area intermediate data sets at least based on the first accessed data sets, and then outputting the intermediate data sets from the second buffer storage area.

2. The method according to claim 1, said method further comprising, when the buffer control signal has the second state and subsequent to outputting the intermediate data sets from the second buffer storage area, obtaining second accessed data sets from a second data storage area according to the intermediate data sets.

3. The method according to claim 1, wherein each second portion includes a coordinate pair, and
wherein said obtaining first accessed data sets comprises accessing a texture map according to the coordinate pairs.

4. The method according to claim 1, Wherein when the buffer control signal has the first state, each among the first portions is outputted synchronously with a corresponding one among the first accessed data sets, and
wherein when the buffer control signal has the second state, each among the first portions is outputted synchronously with a corresponding one among the second accessed data sets.

5. The method according to claim 1, said method further comprising, when the buffer control signal has the second state, obtaining at least one of the intermediate data sets by perturbing at least one of the second portions according to at least one of the first accessed data sets.

6. The method according to claim 5, wherein each among the second portions includes a coordinate pair, and
wherein each among the intermediate data sets includes a perturbed coordinate pair.

7. A pipeline configured and arranged to receive a buffer control signal and a plurality of data sets, each data set having a first portion and a second portion, said pipeline comprising:
a buffer having a first buffer storage area and a second buffer storage area, the first buffer storage area being configured and arranged to receive, store, and output at least some of the plurality of first portions; and
a logical unit coupled to a first storage area and a second storage area and configured and arranged to receive the plurality of second portions and to obtain first accessed data sets from the first storage area according to the plurality of second portions,
wherein, when the buffer control signal has a first state, said second buffer storage area is configured and arranged to receive, store, and output at least some of the plurality of first portions, and
wherein, when the buffer control signal has a second state different from the first state, said second buffer storage area is configured and arranged to receive, to store, and to output intermediate data sets at least based on the first accessed data sets.

8. The pipeline according to claim 7, wherein, when the buffer control signal has a second state different from the first state, said logical unit is further configured and arranged to receive the intermediate data sets from said second buffer storage area and to obtain second accessed data sets from the second storage area according to the intermediate data sets.

9. The pipeline according to claim 7, wherein each among the second portions includes a coordinate pair.

10. The pipeline according to claim 7, wherein the logical unit is configured and arranged to obtain the first accessed data sets from storage locations indicated by the second portions.

11. The pipeline according to claim 10, wherein, when the buffer control signal has the second state, said logical unit is configured and arranged to obtain the second accessed data sets from storage locations indicated by the intermediate data sets.

12. The pipeline according to claim 7, wherein the logical unit is configured and arranged to calculate at least one among the intermediate data sets based on at least one among the first accessed data sets and at least one among the second portions.

13. The pipeline according to claim 7, wherein the logical unit is configured and arranged to calculate at least one among the intermediate data sets as a perturbation of at least one among the second portions according to at least one among the first accessed data sets.

14. The pipeline according to claim 7, wherein the logical unit is configured and arranged to calculate at least one among the intermediate data sets as a displacement of at least one among the second portions according to at least one among the first accessed data sets.

15. The pipeline according to claim 7, wherein the logical unit is configured and arranged to perform at least one among a rotation and a scaling operation on at least one among the first accessed data sets.

16. The pipeline according to claim 7, wherein, when the buffer control signal has the second state, said logical unit is configured and arranged to obtain the second accessed data sets from storage locations indicated by the intermediate data sets.

17. The pipeline according to claim 7, wherein, when the buffer control signal has a second state different from the first state, said second buffer storage area is configured and arranged to receive the intermediate data sets from said logical unit.

18. An integrated circuit comprising a pixel combiner and a pipeline configured and arranged to receive a buffer control signal and a plurality of data sets, each data set having a first portion and a second portion, said pipeline comprising:
a buffer having a first buffer storage area and a second buffer storage area, the first buffer storage area being configured and arranged to receive, store, and output at least some of the plurality of first portions; and
a logical unit coupled to a first storage area and a second storage area and configured and arranged to receive the plurality of second portions and to obtain first accessed data sets from the first storage area according to the plurality of second portions,
wherein, when the buffer control signal has a first state, said second buffer storage area is configured and arranged to receive, store, and output at least some of the plurality of first portions, and
wherein, when the buffer control signal has a second state different from the first state, said second buffer storage area is configured and arranged to receive from said logical unit, to store, and to output intermediate data sets at least based on the first accessed data sets, and said logical unit is further configured and arranged to receive the intermediate data sets from said second buffer storage area and to obtain second accessed data sets from the second storage area according to the intermediate data sets,
wherein said pixel combiner is configured and arranged to receive from the pipeline the first portions and one among (A) the first accessed data sets and (B) the second accessed data sets.

19. The integrated circuit according to claim 18, wherein said integrated circuit includes an array of logic elements, and
wherein at least one among said pixel combiner and said logical unit comprises a sequence of instructions executable by said array of logic elements.

20. The integrated circuit according to claim 18, wherein said logical unit is configured and arranged to calculate at least one among the intermediate data sets as a perturbation of at least one among the second portions according to at least one among the first accessed data sets.

21. The integrated circuit according to claim 18, wherein said logical unit is configured and arranged to perform at least one among a rotation and a scaling operation on at least one among the first accessed data sets.

22. The integrated circuit according to claim 18, wherein said pixel combiner is further configured and arranged to perform at least one among an addition operation and a multiplication operation.

23. A configurable buffer configured and arranged to receive a control signal, said buffer comprising:
a first buffer storage area and a second buffer storage area;
a first input port and a second input port; and
a first output port and a second output port,
wherein said buffer is further configured and arranged to receive a plurality of first data values through said first input port, to store at least a portion of the plurality of first data values in said first buffer storage area, and to output the plurality of first data values through said first output port, and wherein, when the control signal has a first state, said buffer is further configured and arranged to store at least a portion of the plurality of first data values in said second buffer storage area, and wherein, when the control signal has a second state different from the first state, said buffer is further configured and arranged to receive a plurality of second data values through said second input port, to store the plurality of second data values in said second buffer storage area, and to output the plurality of second data values through said second output port.

24. The configurable buffer according to claim 23, said buffer being further configured and arranged to output at least one of the plurality of first data values from each among said first and second buffer storage areas during a single clock cycle.

25. The configurable buffer according to claim 23, said buffer being further configured and arranged to output each among the first data values synchronously with a corresponding one among the second data values.

26. A configurable buffer configured and arranged to receive a control signal, said buffer comprising:

a fist input port and a second input port;

a first buffer storage area having a storage capacity of m data values; and a second buffer storage area having a storage capacity of n data values, wherein, when the control signal has a fist state, said buffer is configured and arranged to receive data values through said first input port and said first and second buffer storage areas are configured and arranged to form a queue having a capacity of (m+n) data values, said queue being configured and arranged to store the received data values, and wherein, when the control signal has a second state different than the first state, said buffer is configured and arranged to receive first data values through said first input port and second data values through said second input port, said first buffer storage area is configured and arranged to store the received first data values, and said second buffer storage area is configured and arranged to store the received second data values.

27. The configurable buffer according b claim 26, said buffer being further configured and arranged to output at least one of the plurality of received data values from each among said first and second buffer storage areas during a single clock cycle.

28. The configurable buffer according to claim 26, said buffer being further configured and arranged to output each among the received first data values synchronously with a corresponding one among the received second data values.

* * * * *